United States Patent
Flory et al.

(10) Patent No.: US 7,213,884 B2
(45) Date of Patent: May 8, 2007

(54) VEHICLE SEAT WITH HEADREST COMPRISING NUCHAL AND LATERAL SUPPORTS

(75) Inventors: Gerhard Flory, Annweiler (DE); Thomas Geisel, Rottenburg (DE); Karsten Radonaut, Kaiserslautern (DE); Andreas Schmidt, Ludwigshafen (DE); Andreas Weingart, Niederkirchen (DE); Guenter Franzmann, Rockenhausen (DE)

(73) Assignee: DaimlerChrysler AG, Stuttgart (DE)

( * ) Notice: Subject to any disclaimer, the term of this patent is extended or adjusted under 35 U.S.C. 154(b) by 81 days.

(21) Appl. No.: 10/506,775

(22) PCT Filed: Feb. 8, 2003

(86) PCT No.: PCT/EP03/01267

§ 371 (c)(1),
(2), (4) Date: Mar. 16, 2005

(87) PCT Pub. No.: WO03/074319

PCT Pub. Date: Sep. 12, 2003

(65) Prior Publication Data
US 2005/0161993 A1    Jul. 28, 2005

(30) Foreign Application Priority Data
Mar. 4, 2002    (DE) ................ 102 09 187

(51) Int. Cl.
*A47C 7/38*    (2006.01)
(52) U.S. Cl. .................. 297/398; 297/397; 297/406; 297/407; 297/216.12
(58) Field of Classification Search .......... 297/406, 297/408, 216.12, 397, 398, 407
See application file for complete search history.

(56) References Cited

U.S. PATENT DOCUMENTS

| 57,926 | A | * | 9/1866 | La France et al. ......... 297/407 |
| 2,464,435 | A | * | 3/1949 | Conradt ...................... 297/397 |
| 3,090,648 | A | * | 5/1963 | Snyder ....................... 297/398 |
| 4,797,934 | A | * | 1/1989 | Hufnagel ................ 297/398 X |
| 4,883,243 | A | * | 11/1989 | Herndon ............ 297/216.12 X |
| 5,752,742 | A | | 5/1998 | Kerner et al. ............... 297/406 |
| 6,120,099 | A | * | 9/2000 | Reikerås et al. ........ 297/406 X |
| 6,123,389 | A | * | 9/2000 | O'Connor et al. .......... 297/397 |
| 6,139,106 | A | * | 10/2000 | Aldridge ..................... 297/406 |
| 6,220,668 | B1 | | 4/2001 | Scheffzück ................. 297/391 |
| 6,305,749 | B1 | * | 10/2001 | O'Connor et al. .......... 297/397 |
| 6,513,871 | B2 | * | 2/2003 | Bartels ................... 297/216.12 |
| 6,568,754 | B1 | * | 5/2003 | Norton et al. ......... 297/216.12 |
| 6,601,804 | B2 | * | 8/2003 | Bisch ..................... 297/397 X |
| 6,641,220 | B2 | * | 11/2003 | Clegg ......................... 297/397 |
| 6,648,416 | B2 | * | 11/2003 | O'Connor et al. .......... 297/397 |

(Continued)

FOREIGN PATENT DOCUMENTS

DE        38 20 658        12/1989

(Continued)

*Primary Examiner*—Rodney B White
(74) *Attorney, Agent, or Firm*—Crowell & Moring LLP

(57) ABSTRACT

A vehicle seat has a headrest with a center pad and two side pads that are laterally hinged to the center pad. The side pads are swivellable forward into a resting position and back into a supporting position. The center pad has a variable pad hardness, with a firmer pad hardness in the supporting position than in the resting position.

36 Claims, 3 Drawing Sheets

U.S. PATENT DOCUMENTS

| | | | |
|---|---|---|---|
| 6,692,071 B2 * | 2/2004 | Fowler | 297/216.12 |
| 6,761,403 B2 * | 7/2004 | Pal et al. | 267/216.12 |
| 6,779,839 B2 * | 8/2004 | Andreasson et al. | 297/408 X |
| 6,820,930 B2 * | 11/2004 | Dellanno | 297/216.12 |
| 6,863,343 B2 * | 3/2005 | Pal et al. | 297/216.12 |
| 6,890,028 B2 * | 5/2005 | Pal et al. | 297/216.12 |
| 6,893,094 B2 * | 5/2005 | O'Connor | 297/397 |
| 6,938,958 B2 * | 9/2005 | Gold et al. | 297/397 |
| 7,040,705 B2 * | 5/2006 | Clough | 297/408 X |
| 7,048,334 B2 * | 5/2006 | Pal et al. | 297/216.12 |
| 7,080,886 B2 * | 7/2006 | Bauer | 297/406 X |
| 7,093,903 B2 * | 8/2006 | O'Connor et al. | 297/397 |

FOREIGN PATENT DOCUMENTS

| | | |
|---|---|---|
| DE | 196 53 516 | 6/1997 |
| DE | 199 47 872 C | 2/2001 |
| DE | 100 61 346 | 6/2002 |
| FR | 2 806 984 | 10/2001 |
| FR | 2 811 949 | 1/2002 |
| GB | 94 18 878.5 | 3/1995 |
| WO | WO 95/09742 A | 4/1995 |

* cited by examiner

VEHICLE SEAT WITH HEADREST COMPRISING NUCHAL AND LATERAL SUPPORTS

BACKGROUND AND SUMMARY OF THE INVENTION

The invention relates to a vehicle seat having an upright seating position and an angled-back rest position, and having a headrest connected to the vehicle seat by rods, which headrest has a center pad and two side pads adjoining the center pad to right and left, the side pads being pivotable from a swiveled-back supporting position.

A vehicle seat with headrest is known from DE 38 20 658 A1. From the backrest of the vehicle seat, two padded parts can be extended upward to the height of the headrest. These can serve as an additional rest pad for a vehicle passenger. The drawback with this is that the rest pads offer only inadequate support to the head of the vehicle passenger. The upwardly extended rest pads are lacking, moreover, in the back and shoulder regions, so that this solution offers merely a relatively uncomfortable support.

DE 196 53 516 A1 shows a headrest for a vehicle seat, having a center part and two side parts. The side parts are disposed movably against the center part and can be brought out of a starting position alongside the center part into a forward head-resting position. Here, the side parts offer only inadequate lateral support, so that the head is imperfectly supported during cornering. Because of the position of the headrest, moreover, the head of the seat occupant is subjected to a forward-directed tilting moment, for which the seat occupant must compensate by tensing his neck muscles.

German utility model G 94 18 878.5 shows an upholstered headrest for a child's bicycle seat. The headrest is fastened with rubber bands to the top side of a child's bicycle seat. It has a flexible pad, which is held in an arc by the rubber bands and thus, in the rest position, offers lateral guidance to the head. For a normal, upright seating position the pad is unsuitable, since, on the one hand, it is very unstable and, on the other hand, it severely restricts the view to the side.

The object of the present invention is to provide a vehicle seat which offers appropriate and comfortable support for the head both in the upright seating position and in a rest position. In particular, the vehicle seat is intended to offer good lateral guidance for the head and to be configured such that it promotes an upright head carriage, e.g. for driving or reading, and also a relaxed head carriage, e.g. for resting or sleeping, preferably without a forward-directed tilting moment acting upon the head.

According to the invention, this object is achieved by a vehicle seat wherein the center pad has a variable pad hardness with a firmer pad hardness in the supporting position than in the resting position.

The vehicle seat has a headrest, which headrest has a center pad and two side pads adjoining the center pad to right and left. The center pad has a variable pad hardness. In the supporting position, i.e. with upright head carriage and with side pads swiveled back into the basic position, e.g. for reading or driving, the center pad has a firmer pad hardness. The head does not then sink so deeply down into the pad and is well supported. There is thus no obstruction to a lateral movement of the head and/or the side view. For a relaxed rest position, preferably with head leant back, the side pads are swiveled forward from the basic position into the resting position. The pad hardness of the center pad is reduced in the resting position, so that the head sinks deeper into the pad. The head is thereby held with greater bearing surface than when resting against the harder pad.

It is envisaged that the side pads cooperate with the center pad to reduce pad hardness when swiveled forward and to increase pad hardness when swiveled back. The forward-swiveled side pads can be swiveled forward from the basic position into contact with the head and thus offer good lateral support for the head. This prevents the head from rocking from one side of the headrest to the other side during sleeping and/or cornering.

It is envisaged, in particular, to configure the headrest contour to match the head shape of the back of the head and neck. The headrest thereby ensures good and comfortable support for the head in the head and neck region.

A particularly good head support is ensured by the angle of the headrest being adjustable relative to the vehicle seat. Thus the headrest can be adjusted such that the head and/or neck region can be optimally supported in each seating position. Moreover, the rotation axes of the side pads can be disposed such that the head, with the side pads swiveled forward, is enveloped in the headrest from behind and is supported similarly to in a prism. A good and relaxed and also secure support for the head is therefore obtained, even when sleeping.

In order to adapt the headrest to persons of different size, it is envisaged that the headrest is adjustable in height. It can have an automatically driven height-adjustment mechanism, which, for example, moves the headrest up or down relative to the seat cushion by means of an electric linear drive, preferably a spindle drive.

The side pads of the headrest can be configured such that they are manually adjustable. It can herein be envisaged that the side pads latch-lock in the end positions of the support and/or resting position in order to acquire a visually attractive exterior and prevent inadvertent adjustment of the side parts. In the freely adjustable intermediate positions, the side pads are held in place by friction. The friction is here dimensioned such that the side parts, on the one hand, cannot inadvertently be adjusted and, on the other hand, if the head should hit hard upon the side cheeks, e.g. as the result of an accident, the latter swivel back easily and pose no risk of injury.

In one embodiment, the vehicle seat can be configured as a vehicle rest seat, which has a pivotable backrest and an angle-adjustable seat surface. The vehicle rest seat can be moved from an upright seating position, preferably drive position or usage position, by angling of the backrest and/or seat surface into an angled-back rest position.

In order to be able easily to remove or exchange the headrest, this is connected to the vehicle seat by rods engaging in the backrest. The rods can latch-lock in the backrest and are thus held securely in place.

It is possible to use the vehicle seat according to the invention in passenger vehicles, buses and water craft or rail vehicles. Use of the vehicle seat according to the invention as a comfortable passenger chair in aircraft is also envisaged.

Further features and embodiments of the invention can be derived from the claims, the figures and the description of the figures. The aforementioned and below-stated features and combinations of features can be used not only in the respectively indicated combination but also in other combinations or in isolation, without departing from the scope of the invention.

Further embodiments of the invention are represented and explained in the drawings, in which:

DETAILED DESCRIPTION OF THE DRAWINGS

Figure 1:
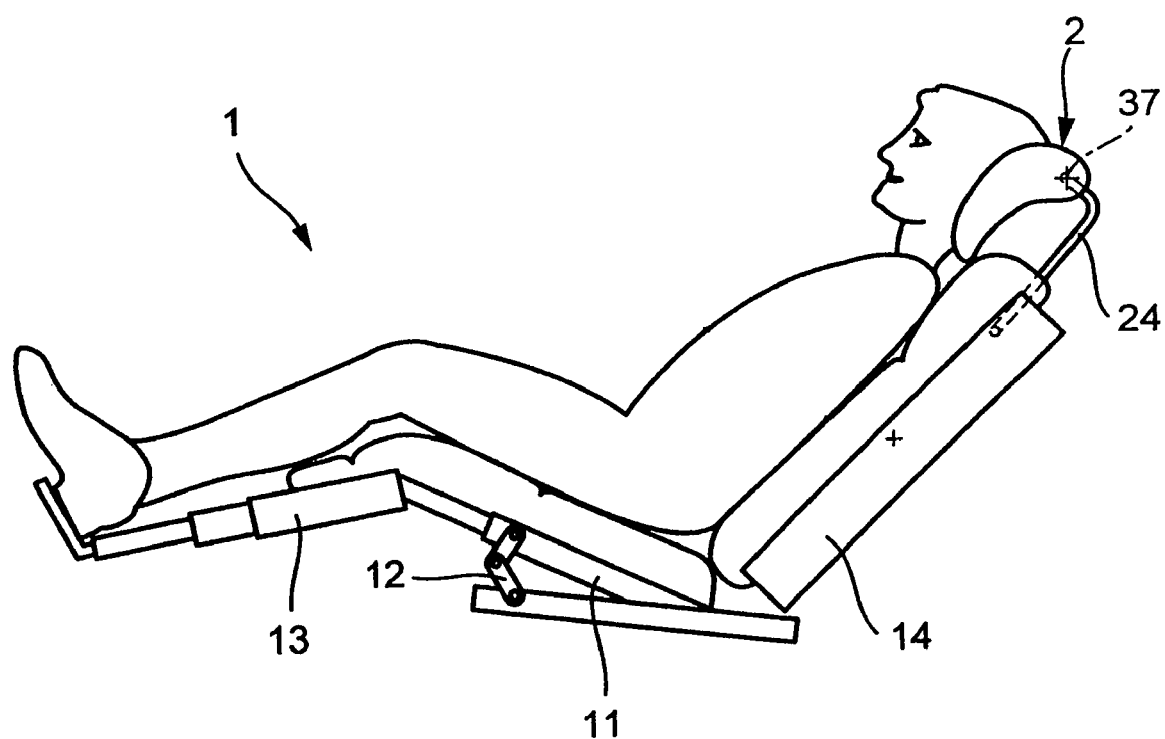
FIG. 1: shows a vehicle seat in the rest position with headrest.

In FIG. 1, a vehicle seat 1 is represented with a person in a rest position. The vehicle seat is configured as an adjustable vehicle seat with an upright seating position, as is usual in a conventional vehicle seat, and an adjustable rest position. It has a padded backrest 14, a padded seat cushion 11 and a footrest 13. At the upper end of the backrest 14 there is disposed a headrest 2. In the rest position represented in FIG. 1, the footrest 13 is raised relative to an upright seating position, so that the seat occupant can rest his feet comfortably on the footrest 13. The seat cushion 11 can be angle-adjusted by means of a seat cushion adjuster 12, so that the seat cushion 11 forms a seat surface with adjustable angle.

The backrest 14 is pivotable about a swivel axis running transversely to the seat surface, so that a more upright seating position or a more reclining rest position can be chosen.

The headrest 2 disposed at the upper end of the backrest 14 is connected to the backrest by holding rods 24, the holding rods engaging in the backrest 14 from above. In the backrest 14 there is disposed a receiving fixture for the rods 24, which latch-locks detachably with the rods 24. For adjustment of the height of the headrest 2, this receiving fixture has a drive mechanism, which moves the receiving fixture up and/or down in the backrest 14. Thus the rods can engage more or less deeply in the backrest 14 and the height of the headrest 2 can thus be adapted to the seat occupant.

The headrest 2 and/or the head pad of the headrest 2 has a contour matched to the back of the head region and/or neck region. In addition, the angle of the headrest 2 is adjustable about a swivel axis 37 disposed in the upper region of the headrest 2. Through swiveling of the headrest 2 about this swivel axis 37, the lower region of the headrest 2 can be swiveled optimally into the neck of the seat occupant and thus promotes a relaxed head carriage. The headrest 2 thus ensures an areal support for the head and neck both in the upright seating position and in the angled-back reclining position. This adjustment facility and the contour of the headrest 2, which contour is matched to the back of the head region, have the effect, on the one hand, that the headrest 2 forms a perfect rest for the back of the head and neck of the seat occupant and, on the other hand, that the head of the seat occupant is subjected to no tilting moment in the direction of the chin.

Figure 2:
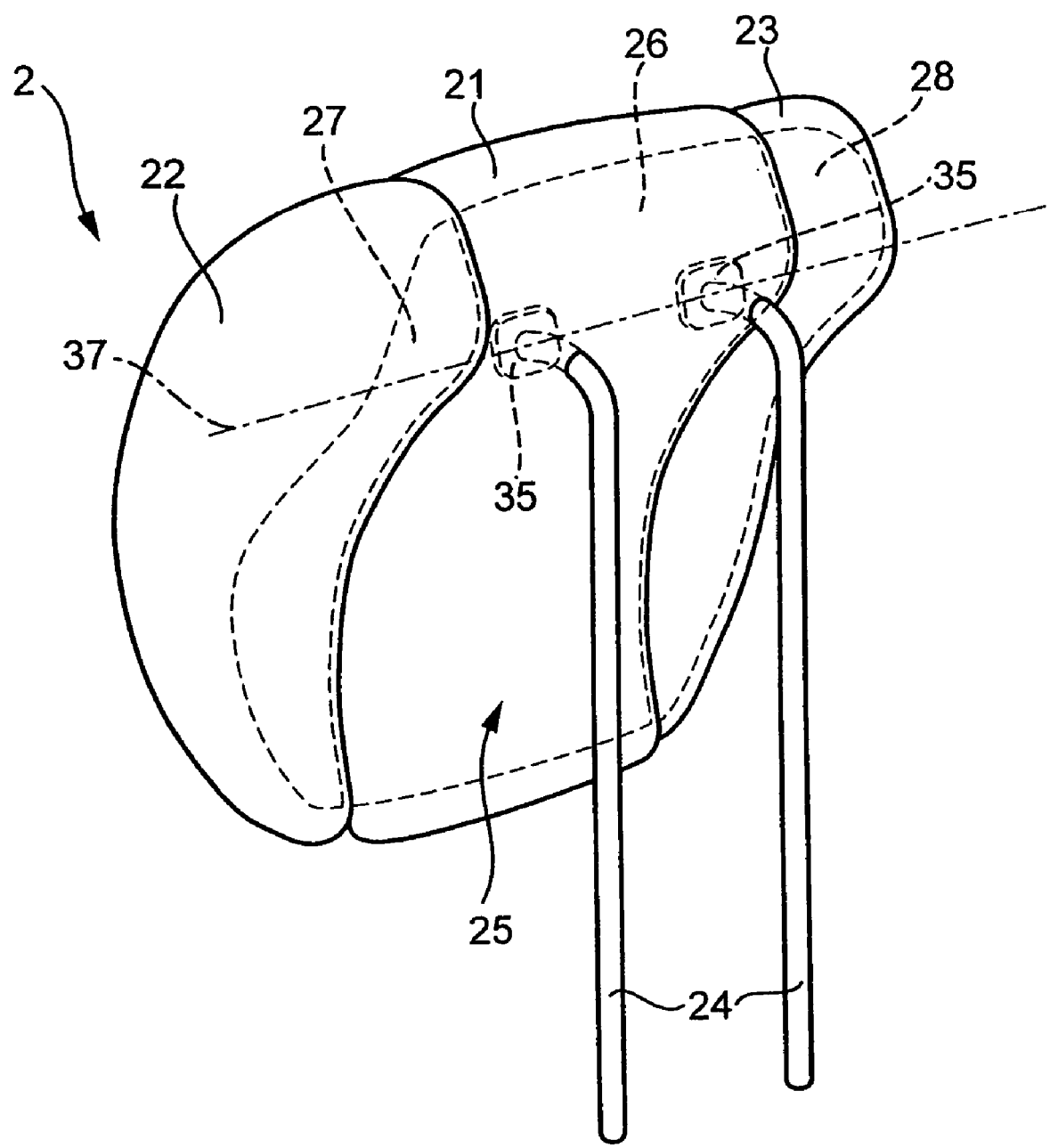
FIG. 2: shows a perspective representation of the headrest.

The structure of the headrest 2 is represented in FIG. 2. The headrest 2 has a center pad 21 and two side pads 22, 23 directly adjoining the center pad 21 to right and left. A flexurally rigid carrier plate 25, formed, for example, from plastic, supports the pads 21, 22, 23 on the rear side, facing away from the seat occupant, of the headrest 2. The carrier plate 25 is tripartite and has a center part 26 and two side parts 27 and 28 pivotably connected to the center part 26. The center part 26 of the carrier plate 25 bears the center pad 21 and the side parts 27 and 28 each bear a respective side pad 22 and 23.

The carrier plate 25 has on its center part two pivot bearings 35, which pivotably connect the carrier plate 25 to the rods 24 and are disposed at the upper end, facing away from the vehicle seat, of the center part 26. The two pivot bearings 35 define the swivel axis 37 about which the headrest 2 is pivotably mounted for the angle adjustment. The angle of the headrest is adjusted manually, the adjusted angle being maintained by friction clamping of the pivot bearings 35.

For improved lateral guidance of the head, the side pads 22 and 23 can be swiveled forward from a supporting position, in which the side pads 22, 23 lie flush with the center pad 21, into a resting position.

Figure 3:
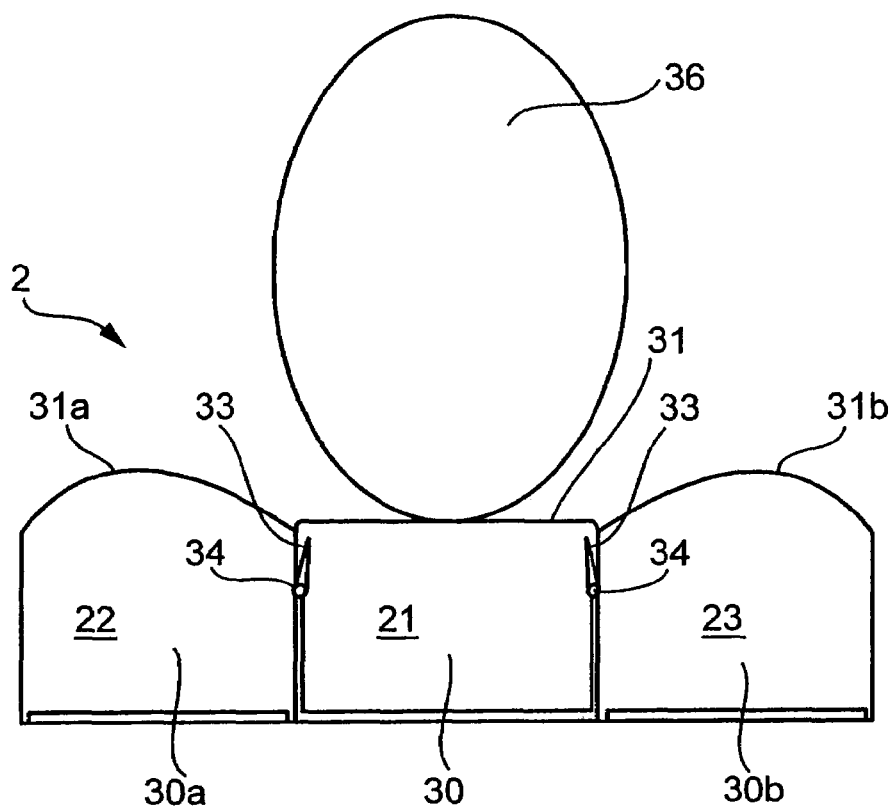
FIG. 3: shows a schematic representation of the headrest in the supporting position.

FIG. 3 shows the headrest in the supporting position of the side pads and the consequent resting of the head 36 against the center pad 21, in schematic top view. The headrest 2 has a cover 31 made from leather or some other cover material, which, on the rear side of the headrest 2, covers the carrier plate 25 in a closed manner and, on the front side, is made separately for the center pad 21 and the side pads 22, 23. The pads respectively have a pad core 30, 30a, 30b and a pad cover 31, 31a, 31b.

The pad core 30 of the center pad 21 has an approximately cuboidal cross section. On both sides of the center pad 21 there are disposed cover mountings 33, in which the pad cover 31 of the center pad 21 is hung. The cover mountings 33 have an approximately U-shaped form with long side members placed close together. They are connected at their closed end to the carrier plate 25 and have there a rotation axis 34. The pad cover 31 is introduced into the forward-facing opening of the cover mountings 33 and fastened there, e.g. by clamping and/or gluing and/or welding.

In the supporting position represented in FIG. 3, the side members of the cover mountings 33 are aligned approximately parallel to the side parts of the center pad 21 and hold the cover material 31 taut over the center pad 21. In the supporting position, the center pad 21 thus has a high surface tension and a relatively hard padding. The head 36 therefore has a contact surface tightly supported by the center pad 21. There is no obstruction to the lateral movement of the head and/or the side view in the supporting position. This is particularly advantageous in an erect seating position and/or when reading and/or writing in the seat.

Figure 4:
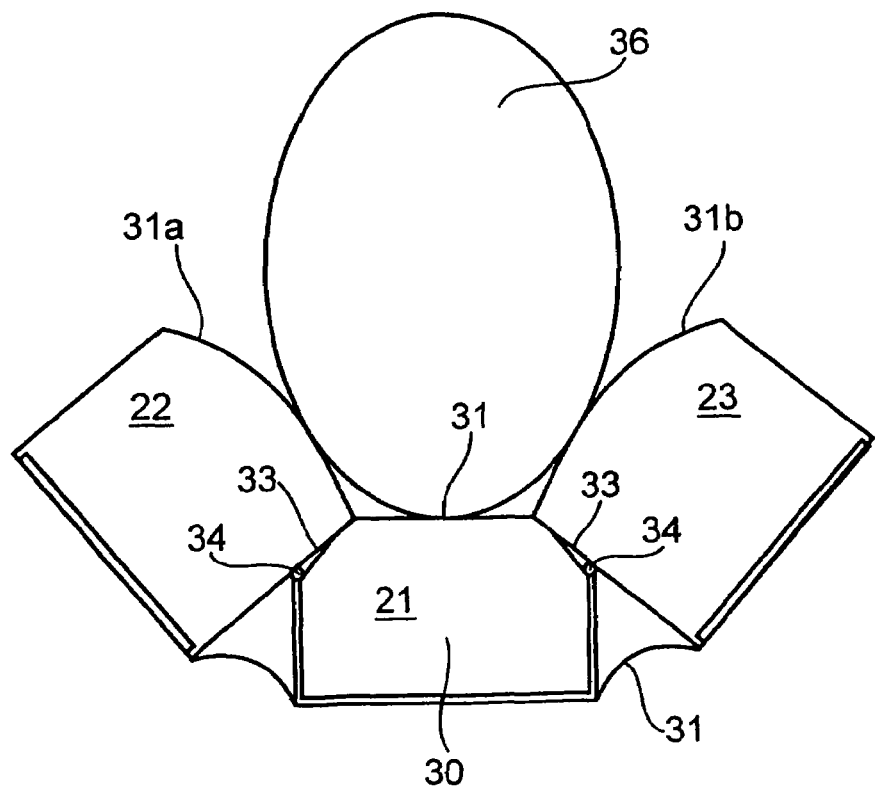
FIG. 4: shows a schematic representation of the headrest in the resting position.

FIG. 4 shows, at variance with FIG. 3, a resting position of the headrest 2. Here, the side pads 22 and 23 are swiveled forward toward the head 36. The center pad 21 and the two side pads 22 and 23 are in contact with the head 36. This is held and/or supported by the headrest 2 as in a prism.

The side pads 22, 23 swivel about an axis disposed in the region of the rotation axis 34 of the cover mountings. As they are swiveled, they cooperate with the cover mountings 33 by pressing them toward the center pad 21. The pad hardness of the center pad is reduced by the cover mountings 33 rotating respectively about the rotation axis 34 and thus slackening the cover 31. The side pads 22, 23 additionally compress the surface of the pad core 30 of the center pad 21 and thus promote the slackening of the center pad 21. In the resting position, the head 36 can sink deeper into the center pad 21 than in the supporting position. The contact surface between the center pad 21 and the head is thereby enlarged, producing a soft support for the head and/or a relaxed head carriage. The soft support and the envelopment of the back of the head prevents the head from rocking when cornering in right and left-hand bends, thereby allowing a relaxed head carriage and/or relaxed and comfortable sleeping in the seat, even during travel.

As the side pads 22, 23 are swiveled back, they slacken the center pad 21, so that its pad core 30 presses the cover mountings outward, so that these are turned back into the position represented in FIG. 3 and re-tighten the pad cover 31. The padding of the center pad 21 is thus hardened and the head can no longer penetrate as deeply into the center pad.

The side pads 22, 23 are pivoted manually. The side pads 22, 23 are mounted such that, under normal load, any chosen intermediate position which is set is maintained by friction and/or friction clamping. If, in a crash, the head hits a side cheek by rebound with heavy force, then this can swivel back and poses no risk of injury.

The invention claimed is:

1. A vehicle seat having a headrest connected to the vehicle seat by rods, wherein:
    the headrest has a center pad and two side pads adjoining the center pad to the right and left of the center pad;
    the side pads are pivotable about a swivel axis through intermediate angular positions, from a swiveled-back supporting position into a swiveled-forward resting position; and
    the center pad has a variable pad hardness which varies with the angular position of the side pads.

2. The vehicle seat as claimed in claim 1, wherein the side pads cooperate with the center pad to vary the pad hardness as they are swiveled.

3. The vehicle as claimed in claim 2, wherein the angle of the headrest relative to the backrest is adjustable about a transverse-running swivel axis disposed in its upper region facing away from the vehicle seat.

4. The vehicle as claimed in claim 3, wherein the headrest has a carrier plate bearing the center pad and the side pads.

5. The vehicle seat as claimed in claim 3, wherein the center pad has a pad core and a pad cover, the pad cover being fastened in two cover mountings disposed on both sides of the center pad and directly adjoining the pad core.

6. The vehicle seat as claimed in claim 5, wherein the tension of the pad cover varies the pad hardness of the center pad since the tightened pad cover hardens the surface of the center pad and the slackened pad cover softens the surface of the center pad.

7. The vehicle seat as claimed in claim 6, wherein the side pads as they are swiveled forward, reduce the tension of the pad cover since the side pads press the cover mountings toward the center of the center pad.

8. The vehicle seat as claimed in claim 6, wherein the cover mountings are configured as U-shaped clamp rails, the clamp rails being respectively rotatable about a rotation axis disposed approximately parallel to the carrier plate and running along the outer contour of the center pad.

9. The vehicle seat as claimed in claim 8, wherein the side pads have a swivel axis disposed to run through the rotation axis of the cover mountings.

10. The vehicle seat as claimed in claim 2, wherein the headrest has a carrier plate bearing the center pad and the side pads.

11. The vehicle seat as claimed in claim 1, wherein the angle of the headrest relative to the backrest is adjustable about a transverse-running swivel axis disposed in its upper region facing away from the vehicle seat.

12. The vehicle as claimed in claim 11, wherein the headrest has a carrier plate bearing the center pad and the side pads.

13. The vehicle seat as claimed in claim 1, wherein the headrest has a carrier plate bearing the center pad and the side pads.

14. The vehicle seat as claimed in claim 13, wherein the carrier plate at its end facing away from the backrest is pivotably connected to the rods by a bearing and is configured such that it can be swiveled about this bearing in order to adjust the headrest angle.

15. The vehicle seat as claimed in claim 14, wherein the center pad has a pad core and a pad cover, the pad cover being fastened in two cover mountings disposed on both sides of the center pad and directly adjoining the pad core.

16. The vehicle seat as claimed in claim 15, wherein the tension of the pad cover varies the pad hardness of the center pad since the tightened pad cover hardens the surface of the center pad and the slackened pad cover softens the surface of the center pad.

17. The vehicle seat as claimed in claim 16, wherein the side pads as they are swiveled forward, reduce the tension of the pad cover since the side pads press the cover mountings toward the center of the center pad.

18. The vehicle seat as claimed in claim 16, wherein the cover mountings are configured as U-shaped clamp rails, the clamp rails being respectively rotatable about a rotation axis disposed approximately parallel to the carrier plate and running along the outer contour of the center pad.

19. The vehicle as claimed in claim 18, wherein the side pads have a swivel axis disposed to run through the rotation axis of the cover mountings.

20. The vehicle seat as claimed in claim 13, wherein the center pad has a pad core and a pad cover, the pad cover being fastened in two cover mountings disposed on both sides of the center pad and directly adjoining the pad core.

21. The vehicle seat as claimed in claim 20, wherein the tension of the pad cover varies the pad hardness of the center pad since the tightened pad cover hardens the surface of the center pad and the slackened pad cover softens the surface of the center pad.

22. The vehicle seat as claimed in claim 21, wherein the side pads as they are swiveled forward, reduce the tension of the pad cover since the side pads press the cover mountings toward the center of the center pad.

23. The vehicle seat as claimed in claim 21, wherein the cover mountings are configured as U-shaped clamp rails, the clamp rails being respectively rotatable about a rotation axis disposed approximately parallel to the carrier plate and running along the outer contour of the center pad.

24. The vehicle seat as claimed in claim 23, wherein the side pads have a swivel axis disposed to run through the rotation axis of the cover mountings.

25. The vehicle seat as claimed in claim 1, wherein the center pad has a pad core and a pad cover, the pad cover being fastened in two cover mountings disposed on both sides of the center pad and directly adjoining the pad core.

26. The vehicle seat as claimed in claim 25, wherein the tension of the pad cover varies the pad hardness of the center pad since the tightened pad cover hardens the surface of the center pad and the slackened pad cover softens the surface of the center pad.

27. The vehicle seat as claimed in claim 26, wherein the cover mountings are configured as U-shaped clamp rails, the clamp rails being respectively rotatable about a rotation axis disposed approximately parallel to the carrier plate and running along the outer contour of the center pad.

28. The vehicle seat as claimed in claim 27, wherein the side pads have a swivel axis disposed to run through the rotation axis of the cover mountings.

29. The vehicle seat as claimed in claim 26, wherein the side pads as they are swiveled forward, reduce the tension of the pad cover since the side pads press the cover mountings toward the center of the center pad.

30. The vehicle seat as claimed in claim 29, wherein the cover mountings are configured as U-shaped clamp rails, the clamp rails being respectively rotatable about a rotation axis disposed approximately parallel to the carrier plate and running along the outer contour of the center pad.

31. The vehicle as claimed in claim 30, wherein the side pads have a swivel axis disposed to run through the rotation axis of the cover mountings.

32. The vehicle seat as claimed in claim 25, wherein the cover mountings are configured as U-shaped clamp rails, the clamp rails being respectively rotatable about a rotation axis disposed approximately parallel to the carrier plate and running along the outer contour of the center pad.

33. The vehicle seat as claimed in claim 32, wherein the side pads have a swivel axis disposed to run through the rotation axis of the cover mountings.

34. A vehicle seat assembly, including a headrest comprising:
   a center pad, and
   side pads adjoining the center pad at opposite lateral sides thereof, said side pads being pivotable about a swivel axis through intermediate angular positions, between a swiveled-back head support position and a swiveled-forward head rest position,
   wherein said center pad and side pads are configured to vary the hardness of the center pad as a function of the angular position of the side pads.

35. An assembly according to claim 34, wherein said center pad and side pads are configured to increase the hardness of the center pad when the side pads are moved from the rest position to the support position.

36. As assembly according to claim 35, wherein the hardness of the center pad is controlled by varying tension on a center pad cover which is operably connected with the side pads.

* * * * *